United States Patent [19]

von der Neyen

[11] 4,304,004
[45] Dec. 1, 1981

[54] APPARATUS FOR TRANSMISSION AND RECEPTION OF FREQUENCY MODULATED DIGITAL COMMUNICATION SIGNALS

[75] Inventor: Hans J. von der Neyen, Munich, Fed. Rep. of Germany

[73] Assignee: Siemens Aktiengesellschaft, Berlin & Munich, Fed. Rep. of Germany

[21] Appl. No.: 116,961

[22] Filed: Jan. 30, 1980

[30] Foreign Application Priority Data

Feb. 13, 1979 [DE] Fed. Rep. of Germany ....... 2905471

[51] Int. Cl.³ ................... H04L 27/14; H04B 1/10
[52] U.S. Cl. ...................... 375/88; 375/102; 375/104; 455/135; 455/143; 455/295; 455/303
[58] Field of Search ............. 375/51, 58, 88, 99, 375/102, 104; 455/303, 304, 295, 296, 312, 142, 143, 140, 133, 135, 63, 65

[56] References Cited

U.S. PATENT DOCUMENTS

| | | |
|---|---|---|
| 3,176,231 | 3/1965 | Vallese et al. ............... 455/65 |
| 3,711,777 | 1/1973 | Tink ............................ 375/88 |
| 3,728,634 | 4/1973 | Watkinson ................... 455/143 |
| 3,895,187 | 7/1975 | Antoszewski ................ 375/88 |
| 4,151,475 | 4/1979 | von der Neyen ............. 375/88 |
| 4,197,501 | 4/1980 | Gammel et al. ............. 375/88 |

Primary Examiner—Marc E. Bookbinder
Attorney, Agent, or Firm—Hill, Van Santen, Steadman, Chiara & Simpson

[57] ABSTRACT

A system for the reception of digital communication signals which are modulated onto a carrier in the form of binary frequency modulation and in which the information losses occurring due to phase and amplitude distortions caused by multi-path propagation are automatically detected in two separate arrangements, one being a frequency discriminator and an amplitude demodulator. The outputs of the two demodulators are connected to a data analyst circuit DA which includes a switching means (13), a regenerator (15) which is connected to the switching arrangement and an AM decision unit (14) which analyzes and determines the switch-over criteria. Mounted before the change-over switch (U) is the switching arrangement (13) which includes a blockable phase follow-up device (PE) for compensating large phase differences between the AM and FM demodulation products which are to be analyzed. The AM decision device includes a time evaluation circuit (ZB) for deriving the switching signal for the change-over switch and for obtaining the control signal for the blockable phase follow-up device (PH).

6 Claims, 20 Drawing Figures

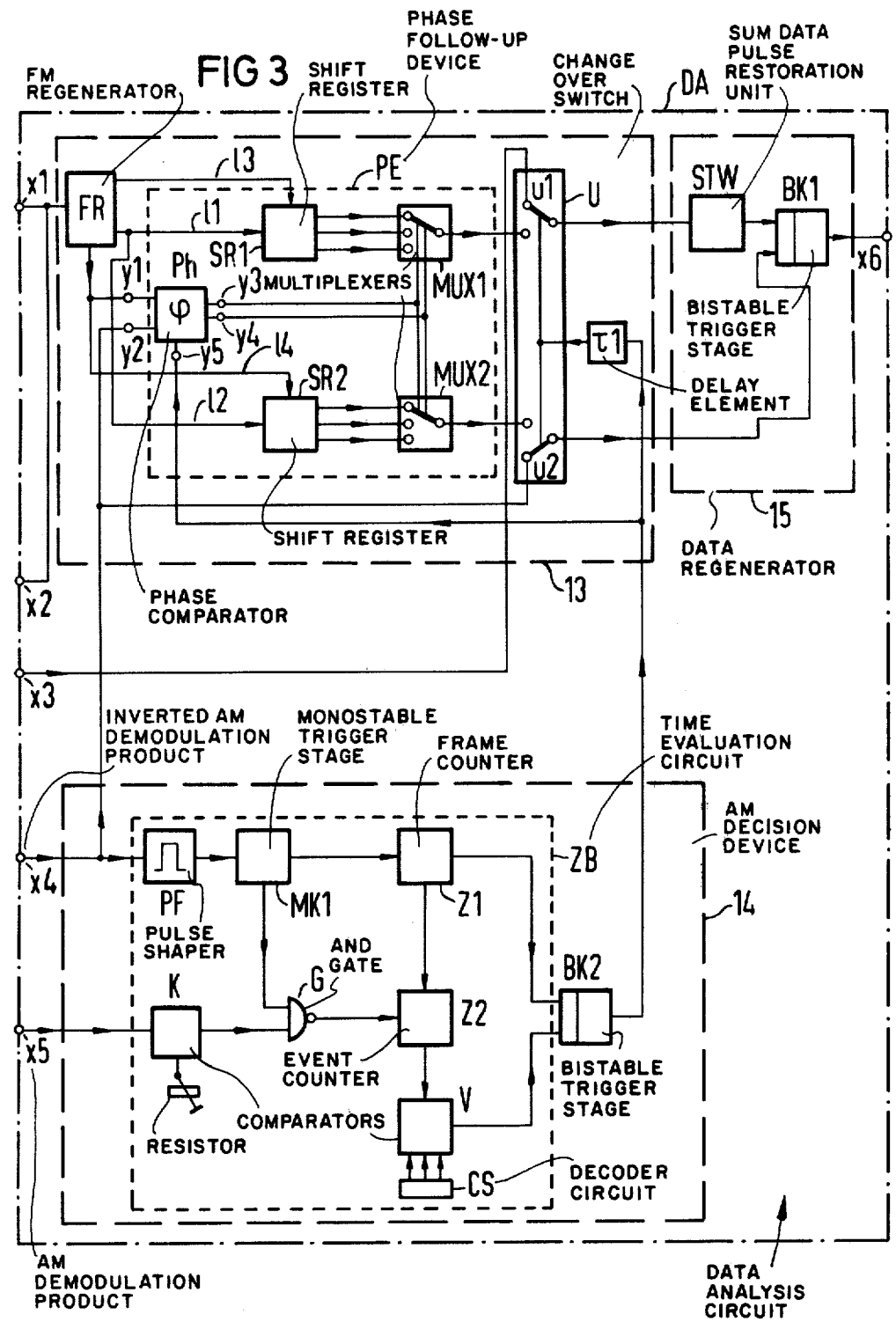

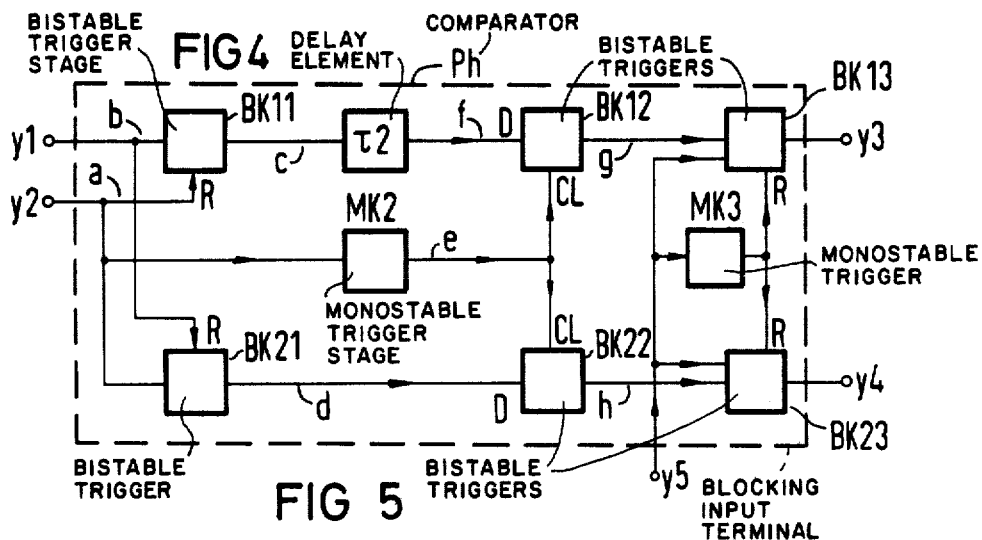
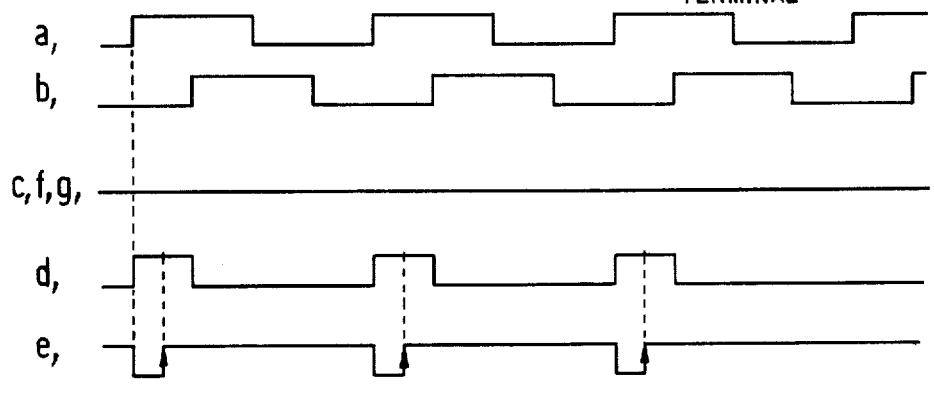
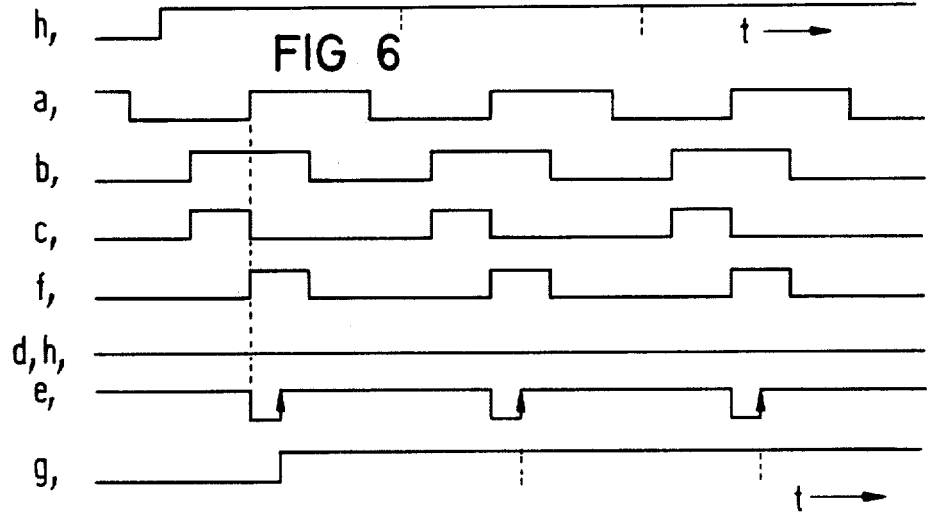

APPARATUS FOR TRANSMISSION AND RECEPTION OF FREQUENCY MODULATED DIGITAL COMMUNICATION SIGNALS

BACKGROUND OF THE INVENTION

1. Field of the Invention

The invention relates to systems for receiving digital communication signals which are modulated onto a carrier in the form of binary frequency modulation and radiated through a propagation medium which is subject to reflection and particular for reception by mobile stations, long distance traffic connections and scattered beam connections.

2. Description of the Prior Art

In digital communication transmission systems under heavily disturbed propagation conditions such as multi-path propagation the range is approximately inversely proportional to the level of the bit rate which is to be transmitted. The critical situation which determines the range consists of total information erasure, wherein due to the differing transit times caused by the path differences between the reflected carrier waves, the modulation signals arrive at the receiver with opposing phase and cancel out each other. Over a wide range before this critical situation partial information losses occur due to the transit time and due to amplitude distortions which cause very high error rates during transmission.

SUMMARY OF THE INVENTION

The present invention comprises an improvement on the inventions described in application Ser. No. 810,904 filed June 28, 1977—now U.S. Pat. No. 4,197,501—entitled "A System For Reception of Frequency Modulated Digital Communication Signals" and in which Joseph Gammel, Karl Kammerlander and Hans-Juergen Van Der Neyen are the inventors. It is to be noted that Hans-Juergen Van Der Neyen is the inventor of the present application.

So as to achieve considerable improvement in the transmission quality where high error rates occur and to improve the range of digital communication systems using binary frequency modulation and particularly between mobile stations and under constantly changing propagation conditions, the referenced patent application Ser. No. 810,904, now U.S. Pat. No. 4,197,501, discloses how the information losses which occur as a result of phase and amplitude distortions can be automatically detected depending upon their origin with two supplementary arrangements one of which comprises a frequency discriminator followed by a device for recognizing interference peaks caused by reflection distortion and a circuit which compensates for these interference peaks and the other which contains an amplitude demodulator connected in parallel with the frequency demodulator. The outputs of both of the demodulators are connected to a change-over switch which is controlled by an amplitude demodulation analysis device such that when amplitude demodulation of sufficient magnitude can be detected the output of the amplitude demodulator is connected to the output and when frequency modulation can be detected, the output of the frequency discriminator and the interference peak recognition device is connected to the output. The output of the AM demodulator is supplied to a polarization inverter which under the control of a polarity integrator which through an AM decision device reverses the polarity of the AM demodulation product depending on the magnitude of the FM demodulation product to obtain the correct polarity of the AM demodulation.

This system solves the problem based on recognition that the distortions which occur in binary frequency modulated digital communication signals caused by multi-path propagation can be expressed by two interference forms which can be distinguished from each other particularly in narrow frequency band systems having a modulation index of less than one.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure and in which:

BRIEF DESCRIPTION OF THE DRAWINGS

FIG. 3 is a block circuit diagram illustrating greater detail of the data analysis circuit of the distortion correcting circuit of the invention;

FIG. 4 is a block circuit diagram illustrating details of the phase comparator of the phase follow-up device illustrated in FIG. 3;

FIG. 5a through FIG. 5h illustrate wave forms existing at various points in the circuit of FIG. 4; and FIG. 6a through FIG. 6h comprise plots of wave forms for explaining the phase comparator of FIG. 4.

DESCRIPTION OF THE PREFERRED EMBODIMENTS

Figure 1:
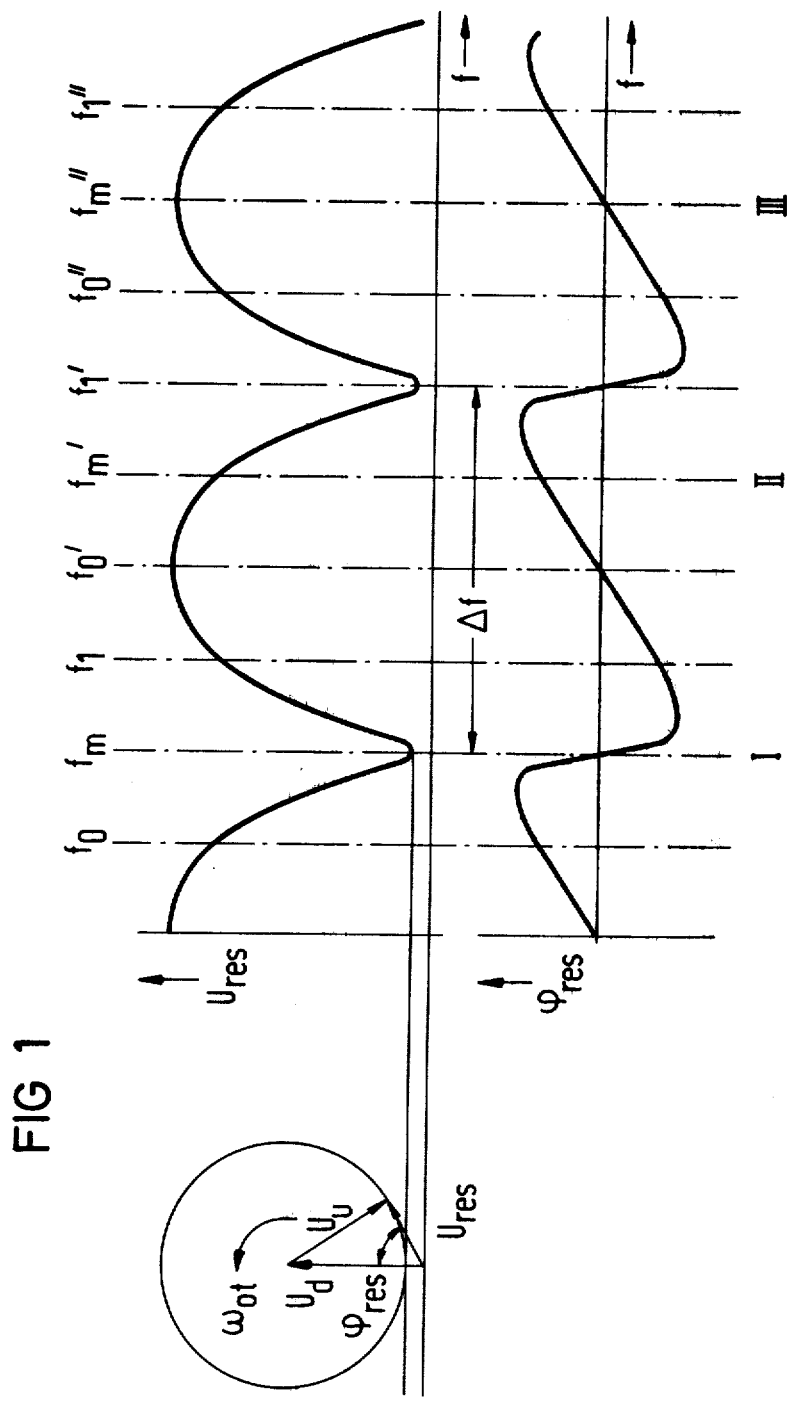
FIG. 1 is a plot illustrating various interference forms occurring in multi-path propagation in a two path model.

FIG. 1 which also corresponds to FIG. 1 in copending application Ser. No. 810,904, now U.S. Pat No. 4,197,501, illustrates three clearly defined situations I, II and III and in the upper diagram the amplitude curve of the signal voltage $U_{res}$ which results from reception of the multi-path signals are plotted against frequency f. In the lower curve in FIG. 1, the resultant phase angle $\phi_{res}$ is plotted against frequency f. At the upper left hand portion of FIG. 1, a vector diagram illustrates how the received signal voltage varies and the directly received voltage $U_d$ and the signal voltage $U_u$ received via a reflected path supplement each other to produce the resultant received signal voltage $U_{res}$.

When the transit time differences between the wave fronts arriving at the receiver of the direct beam and the reflected beam become in the order of the bit duration, the frequency spacing between the minima of the distribution characteristic becomes so small that the energy of the received signal can fluctuate virtually arbitrarily within the modulation range at the modulation speed and depending upon the radio frequency $\omega_{ot}$ and the depth of the minima. One result of these energy fluctuations caused from the vector addition of the incoming signals and which are eliminated in the amplitude limiter of the receiving system before demodulation is that rapid phase changes occur in the resultant signal inevitably occur during the vector addition. These rapid phase changes cannot be suppressed by the amplitude limiter and therefore produce bit synchronous interference modulation at the output of the FM demodulator. The extent of this interference modulation can exceed the useful modulation by multiple and can thus prevent the useful information from being detected.

The maximum phase change speed of the resultant signal voltage occurs in the minima of the distribution characteristic and increases as the minimum becomes lower. In the critical condition which is when selective total extinction exists the phase change speed can become arbitrary.

Depending upon whether the minimum occurs in the middle of the range which with an assumed modulation index of less than 1 is defined by the two angular frequencies, or whether it occurs in the vicinity of one of the angular frequencies, the two different interference forms mentioned above will occur. For the three clearly defined situations I, II and III illustrated in FIG. 1, the angular frequencies have been indicated as $f_0/f_1$, $f_0'/f_1'$ and $f_0''/f_1''$. The middle frequency between the angular frequencies are respectively designated as $f_m$, $f_m'$ and $f_m''$.

(a) Minimum in the vicinity of an angular frequency of the range

If the minimum occurs within or outside of the range, but in the vicinity of one of the two angular frequencies, the received energy at this angular frequency will be relatively low. On the other hand, the received energy at the second angular frequency will always be higher because it lies closer to the next maximum of the resultant signal voltage $U_{res}$. Because of this before the limiter a clearly defined bit-synchronous amplitude modulation occurs in the received signal which has a polarity that is dependent upon the position of the minimum and proportional to or inversely proportional to the original modulating signal. The amplitude limitation which generally takes place in frequency modulation receivers prior to demodulation suppresses this amplitude modulation. For this reason, it does not appear at the output of the demodulator. On the other hand, the phase change which occurs in the vicinity of the minimum in the event of a change in symbol character and which appears at the output of the demodulator as a strong signal distortion is present or active. In situation II illustrated in FIG. 1, the angular frequency $f_1'$ is located at the minimum and the angular frequency $f_0'$ is located at the maximum of the frequency dependent reception characteristic of the resultant signal voltage $U_{res}$. If the energy of the angular frequency $f_1'$ undershoots the internal noise of the receiver an extremely important critical situation in the operating process occurs. Due to the negative noise ratio at one of the angular frequencies, rather than the detection of the logic symbols which correspond to this angular frequencies (zeros or ones), only noise will appear at the limiter and demodulator output. The signal demodulated by the FM demodulator is thus unuseable. However, the received signal prior to the limiter will have bit-synchronous amplitude modulation so that the received signal can be regenerated using this amplitude modulation provided a responsive amplitude exists.

(b) Minimum within the range close to the middle frequency

If the minimum occurs in the middle of the range defined by the two angular frequencies, the interference caused by multi-path reception is manifest as following. The velocity of the phase change in the minimum is manifest at the limiter and demodulator output as a frequency displacement and can reach a multiple of the useful range. The duration of the displacement depends upon the velocity of the modulation and the relative depth of the minimum. If as a result of these two parameters, the duration of the displacement is shorter than the bit duration, the displacement will be manifested within a modulation symbol bit as a peak which has a magnitude and definition which are dependent upon the depth of the minimum. However, the distortion peaks do not occur always within each individual bit, but only in the event of a symbol change because only then will the range be passed through. This is the case illustrated in FIG. 1 in which the minimum occurs at the frequency $f_m$ centered between the two angular frequencies $f_0$ and $f_1$ and designated I. This type of interference can be substantially eliminated by suppressing the interference peaks which occur at the output of the frequency demodulator.

The III situation illustrated in FIG. 1 represents virtually undisturbed reception in which the two angular frequencies $f_0''$ and $f_1''$ occur on both sides of the maximum with adequate amplitude and the amplitude modulation caused by phase distortion is negligible.

Figure 2:
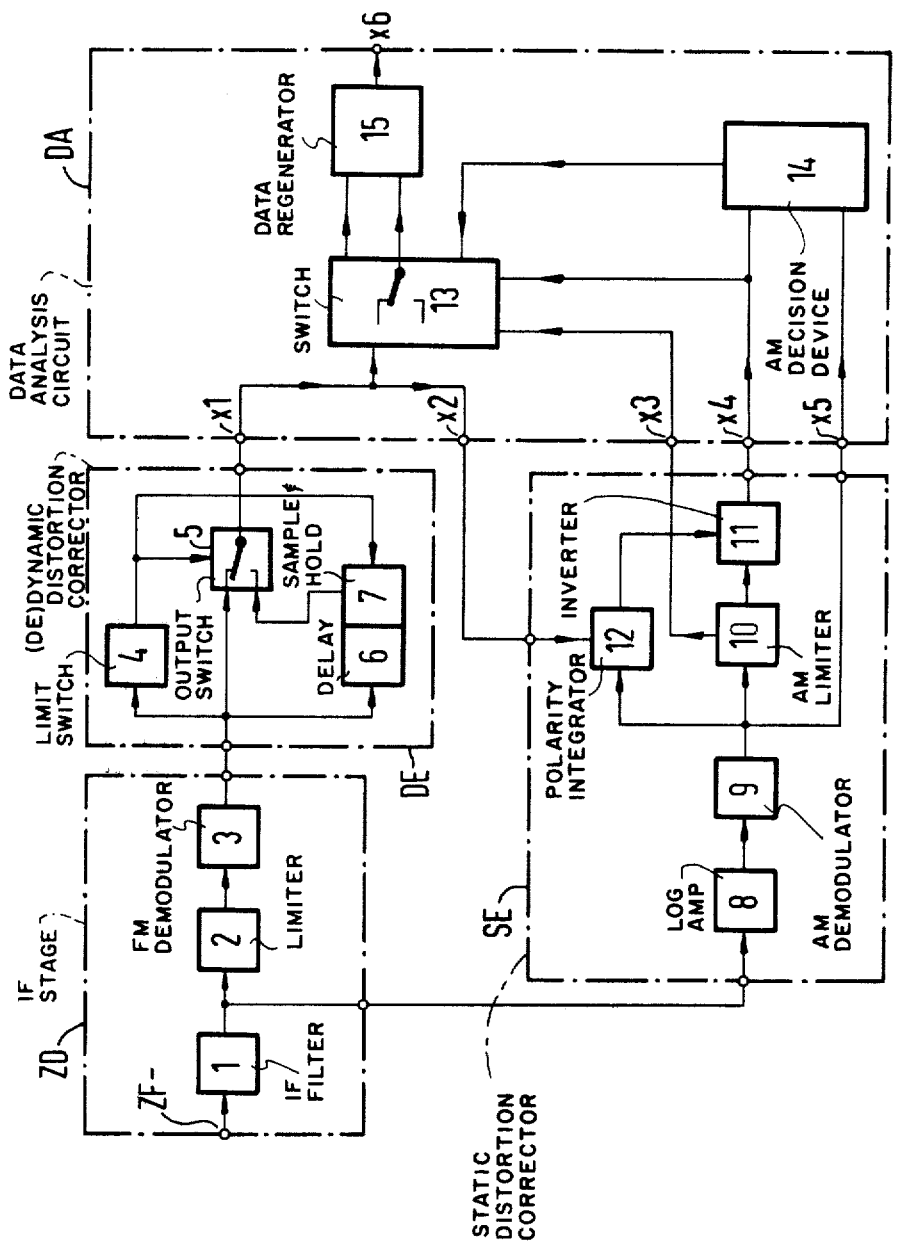
FIG. 2 is a block circuit diagram illustrating a distortion correcting circuit.

FIG. 2 drawing illustrates in block form the fundamental circuitry of a system for the receiving frequency modulated digital communication signals utilizing the interference suppression system described in copending application Ser. No. 810,904, now U. S. Pat. No. 4,197,501, referenced above. The IF and demodulation section ZD form part of a conventional receiver and the IF input signal is fed from terminal ZF to a IF filter 1 and then to a limiter 2 before passing to a FM demodulator 3. A selective IF output is taken from the output of the IF filter 1 and applied to a static distortion corrector SE which serves to suppress interference of the type described under (a) above. The output of the FM demodulator 3 is connected to the input of the dynamic distortion corrector DE which suppresses interferences described above under paragraph (b) associated with multi-path propagation. The outputs of the dynamic and static distortion correctors DE and SE are supplied to a data analysis circuit DA which generates the data output from the received signal free of interference.

The dynamic distortion corrector DE includes a change-over output switch 5 which has one terminal connected to the output of the FM demodulator 3 and the switch in the case of interference free FM reception directly connects the output of the FM demodulator to the switch 13 of the data analysis circuit DA which applies the signal to the data regenerator 15 contained therein which produces the output data.

When interferences such as described under (b) above occur and which comprise dynamic distortions, the limit value switch 4 which also receives the output of the FM demodulator and is connected to control the position of switch 5 and to a sample and hold circuit 7 and produces an output which switches the change over output switch 5 to its second position so that the input of the switch 5 is connected to the output of the sample and hold circuit 7 and simultaneously the sample-hold circuit will receive the output of the FM demodulator 3 through the delay transit time element 6. The sample and hold circuit 6 has its output connected to the second contact of the change-over switch 5 and at the instance at which the limit value switch 4 responds, the sample and hold circuit is thus connected to a delayed signal whose instantaneous value corresponds in the closest approximation to that of the demodulated signal prior to the overshoot of the limit value. For the duration of the overshoot of the limit value, this instantaneous value will be stored in the sample and hold circuit 7 and will be substituted and supplied into the data flow through the second contact of the change-over output switch 5. This allows the energy content of the original bit to be obtained and its legibility in the regenerator 15 is assured.

The IF signal which is output coupled from the output of the IF filter 1 has bit-synchronous amplitude modulation in the case of the interference corresponding to situation (a) which is defined as a static distortion. This AM signal is fed to a logarithmic amplifier 8 and then to a AM demodulator 9. The amplitude demodulator 9 includes a capacitor prior to its output for separating the DC and AC components of the output signal. The output signal of the amplitude demodulator 9 from which the DC component has been removed is supplied to the AM limiter 10 which also includes a pulse restoration stage as well as means for limiting the AM demodulation product and its output is supplied through the controllable inverter 11 to an additional terminal of the switching arrangement 13. The polarity of the demodulated AM signal at the outputs of the amplitude demodulator 9 and the pulse restoration and limiting stage 10 is either in phase or out of phase with the demodulated FM signal at the output of the change-over output switch 5 depending upon whether one or the other of the two angular frequencies has by definition disappeared. In order that the required clearly defined conditions may be established, the legible part of the FM demodulated signal is compared with the AM demodulated signal in the polarity integrator 12 which receives the output of the AM demodulator 9 as well as the output of output switch 5 and if required, the inverter 11 which is controlled by the output of the polarity integrator 12 is switched to its second condition which inverts the signal relative to its other condition.

As shown in FIG. 2, the output of the amplitude demodulator 9 of the static distortion corrector SE and the output of the inverter 11 are connected to separate inputs of the AM decision device 14 which forms part of the data analysis circuit DA and it automatically checks to determine if error free bit synchronous amplitude modulation exists. Only under these conditions does the AM decision device 14 actuate the switching arrangement 13 to connect the output of the inverter 11 to the regenerator 15 which will then be supplied with the data obtained by means of the amplitude demodulation of the received signal. Actual tests made with a distortion correcting circuit of this kind during mobile operations illustrate that in hilly and mountainous terrain, very rapid changes occur in the individual distortion states. So as to be able to provide an effective distortion correction under these circumstances, high adaptation speeds are required of the distortion correction device. In other words, the distortion correction device must be able under unfavorable conditions to switch to a different analysis state up to 80 times per second. At high adaptation speeds of this type, when switching from the FM data flow to the AM data flow and vice versa phase jumps can occur in the associated pulse restoration unit. The disturbed bit integrity which thus occurs in the signal flow at the output of the data analysis circuit DA illustrated in FIG. 2 will cause loss of synchronization in the data reflection component and thus high rates of information loss.

The object of the present invention is to provide a system for receiving digital communication signals as described in copending application Ser. No. 810,904, now U.S. Pat. No. 4,197,501, and to provide a solution which comprises an improvement and further development of the basic system described in copending application and which causes the loss of synchronization in the data reception component to be eliminated with a high degree of reliability even at high adaptation speeds of the distortion correcting circuit.

This object is accomplished in the invention in that the change-over switch which receives the outputs of the two demodulators is expanded so as to form a switching arrangement comprising a double change-over switch for simultaneous switch-over between the FM pulse train and the AM pulse train and between the regenerated FM demodulation product and the regenerated AM demodulation product. Such switching arrangement also comprises a phase follow-up device which is blocked during the absence of an analyzable AM domodulation product and which causes a phase compensation between the AM demodulation product or AM pulse train and the AM demodulation product or FM pulse train. The AM decision device comprises a time evaluation circuit for acquisition both of the switching signal for the double change-over switch and for the control signal for the blockable phase follow-up device.

The invention is based on the fundamental recognition that phase jumps which occur during the switch-over between the two demodulator outputs when a phase follow-up device is used and which are responsible for the loss of synchronization in the data reception component occur when it has not been insured by the introduction of a time evaluation of the switch-over criteria that faulty switching has been eliminated.

Moreover, it is also insured that in the absence of an analysable AM demodulation product, that the phase follow-up device will be unable to operate in an indeterminate manner.

FIG. 3 illustrates the data analysis circuit DA shown in FIG. 2 of the invention which includes the switching arrangement 13, the regenerator 15 and the AM decision device 14. The respective input terminals x1, x2, x3, x4 and x5 and the output terminal x6 of the data analysis circuit shown in FIG. 3 correspond to the terminals illustrated in FIG. 2.

In the present invention, the switching arrangement 13 consists of a FM regenerator FR which receives an input from terminals x1 and x2 and applies an input to the phase follow-up device PE. A change-over switch U receives a pair of outputs from the phase follow-up device PE. A delay element $\tau 1$ is connected to the output of the change-over switch U. The FM demodulation products supplied to terminal x1 from the switch 5 is regenerated in the FM regenerator FR and fed to an input terminal y1 of the phase comparator Ph of the phase follow-up device PE. The FM regenerator FR derives the FM pulse train from the FM demodulation product and also derives a shift pulse train which is the FM pulse train multiplied by a factor of 4 in frequency. The shift pulse train is fed by lines $1_1$ and $1_2$ to a pair of shift registers SR1 and SR2 in the phase follow-up device PE. The FM pulse train is fed to the shift register SR1 through line 13 and the regenerator FM demodulation product is fed to the input of the shift register SR2 by way of line 14. The shift register SR1 together with the multiplexer MUX1 and the shift register SR2 together with the multiplexer MUX2 each comprise delay arrangements which can be controlled by the two outputs y3 and y4 of the phase device Ph for the FM pulse train and for the regenerated FM demodulation product. These delay arrangements supply inputs to the double change-over switch U which comprises the change-over switches u1 and u2. The outputs of the multiplexers MUX1 and MUX2 are each connected to a switching contact of the respective change-over switch u1 and u2. The other switching contact of the change-over switch u1 is connected to the regenerated AM pulse train appearing at terminal x3 and the other switching contact of the change-over switch u2 is connected to the regenerated AM demodulation product appearing at terminal x4. Thus, in the event of switch-over, the pulse train and the demodulation product are simultaneously switched over. The multiplexers have their inputs connected to the stage outputs of the shift registers SR1 and SR2 and the multiplexers in the exemplary embodiment have three switching positions by means of which with the selected shift pulse train make it possible to accomplish phase shifts of plus or minus 90°. When an appropriate signal occurs at the blocking inputs y5, the phase comparator Ph which is supplied with the regenerated AM demodulation product at the second input terminal y2 compares the phase relationship between the AM demodulation product and the FM demodulation product and if necessary causes a phase correction of plus or minus 90° corresponding to the established error by way of its outputs y3 and y4.

The regenerator 15 includes a sum data pulse restoration unit STW which is connected to the movable contact of switch u1 and the output of the sum data pulse restoration unit is applied as a first input to the bistable trigger stage BK1. The pulse train is directly supplied from the switch-over contact of change-over switch u1 to the sum data pulse restoration unit which consists of an oscillator with a phase regulating loop in which the oscillator is synchronized to the pulse train with which it is supplied at its input and its output is connected to the pulse input of the bistable trigger stage BK1. The phase regulating loop compensates the phase jumps in the AM/FM pulse train which occur by way of the output of the switch u1 according to its regulating time constant. The demodulation product present at the switch-over contact of the change-over switch u2 is fed to a second input of the bistable trigger stage BK1. The output of the bistable trigger stage BK1 is connected to output terminal x6 which represents the output of the regenerator 15.

As previously explained, the output signal of the AM decision device is connected to the control input of the double change-over switch U through the delay element τ1. This output signal is also directly fed to the blocking input y5 of the phase comparator Ph of the phase follow-up device PE. The switch-over signal is selected to be such that in an interval of time slightly before the switch-over of the signal analysis from FM to AM occurs the phase shift device Ph will be released to carry out any phase adaptation which may be required prior to switch-over. The delay element τ1 contained in the supply line of the control signal from the output of the AM decision device 14 to the double change-over switch U bridges the time required to conclude the regulating process of the sum data pulse restoration unit STW of the regenerator 15 as the result of a change in phase by the phase follow-up device PE. The same procedure occurs in the event of a switch-over from the analysis of the AM demodulation product to that of the FM demodulation product. This ensures that on one hand in the absence of an AM demodulation product, thus, in situations I and III corresponding to FIG. 1 that no regulation will occur which in this case would be undefined and on the other hand the delay arrangements require only three switching positions. In situation I in which the zero position occurs in the middle of the spectrum, and AM demodulation product could in fact be simulated. In situation I, the levels of the two angular frequencies F0 and F1 are approximately equally attenuated by the distortion. However, noise dependent fluctuations in the FM sampling pulse train can simulate much greater differences in level and, thus, fictitious FM demodulation products which could trigger an incorrect regulation process in comparison to the FM demodulation product in the phase comparator Ph if this were not blocked.

The described large differences in level simulated by noise dependent fluctuations and the FM sampling pulse train would also cause in the AM decision device 14 an undesirable switch-over from the analysis of the FM demodulation product to that of the AM demodulation product if a time evaluation circuit ZB were not used as in the case in the AM decision device 14. The time evaluation circuit ZB has a time gate in the form of a frame counter Z1 which is supplied through terminal x4 with the regenerated AM demodulation product which is fed to the counting input through the series arrangement of the pulse shaper PF and the monostable trigger stage MK1. From the pulse flanks of the regenerated AM demodulation product the pulse shaper PF forms short pulses which are converted into rectangular pulses in the monostable trigger stage MK1. Thus, the frame counter Z1 counts the consecutive pulse flanks and is automatically reset to zero at the end of a frame cycle.

The resetting pulse is simultaneously fed to the pulse train input of the bistable trigger stage BK2 which follows the time evaluation circuit ZB and to the resetting input of the event counter Z2 which receives at its counting input the output end pulses of the monostable trigger stage MK1 through the AND gate G. The second input of the AND gate G is connected to the output of a comparator K which receives an input of the non-regenerated AM demodulation product from terminal x5. As results of the regeneration, the signal present at x4 has a lag of bit/2 relative to the AM demodulation product present at terminal x5. An adjustable resistor R is connected to the comparator K and the resistor R allows a threshold value to be set and the comparator K comprises a threshold value circuit which produces an output signal to the second input of the AND gate G only when the AM a.c. voltage component of the non-regenerated AM demodulation product has reached a value as determined by the setting of the resistor R. This ensures that the event counter Z2 counts each second pulse at the output of the monostable trigger MK1 only when an analyzable AM demodulation product is available. As soon as the event counter Z2 reaches or undershoots the counting position predetermined in an evaluation period by means of the comparator V which is connected to the event counter output, a signal occurs at the input of the bistable trigger stage BK2 and at the instant at which a resetting pulse is emitted from the frame counter Z1 will be emitted through the output of the bistable trigger stage in the form of a pulse shaped switch-over signal which is supplied to the switching device 13 from BK2.

As shown in FIG. 3, the comparator V is also connected to the outputs of decoder circuit CS into which is supplied as input the counter value of the event counter Z2 from which a switch-over is to be effected at the output of the comparator.

FIG. 4 illustrates in detail an embodiment of a blockable phase comparator Ph as illustrated in FIG. 3. The two signal paths between the two input terminals y1 and y2 and the two output terminals y3 and y4 are illustrated. In one signal path a bistable trigger stage BK11 receives an input from terminal y1 and a reset input from terminal y2 and supplies an output to a delay element $\tau 2$ which supplies an output to a bistable trigger stage BK12 which supplies an output to a bistable trigger BK13. The output terminal y3 is connected to the output of the bistable trigger stage BK13. The second signal path comprises the bistable trigger stage BK21, BK22 and BK23 connected in series as shown with bistable trigger stage BK21 receiving an input from terminal y2 and a reset from terminal $y_1$ and supplying on lead d an input to bistable trigger BK22 which has its output connected to the input of bistable trigger circuit BK23. A monostable trigger stage MK2 receives an input from input terminal y2 and supplies input on lead e to bistable triggers BK12 and BK22. The bistable trigger stages BK13 and BK23 are required so as to block the phase shift device Ph and for this purpose receive inputs from the blocking input terminal y5. The monostable trigger stage MK3 receives an input from blocking input terminal y5 and provides outputs to the resetting inputs of the bistable trigger stages BK13 and BK23. As illustrated in FIG. 4, the input terminal y2 is connected to the input of bistable trigger stage BK21 and to the resetting input R of the bistable trigger stage BK11. Input terminal y1 is connected to the input of the bistable trigger stage BK11 and to the resetting input R of the bistable trigger stage BK21.

FIGS 5a through h and 6a through h illustrate voltages occurring at the corresponding points in FIG. 4. The operation of the phase comparator Ph illustrated in FIG. 4 will be explained with reference to FIGS. 5 and 6.

The voltage time diagrams illustrated in FIG. 5a through h represent the situation in which the FM demodulation product present at the input terminals y1 leads AM demodulation product present at the input terminal y2 by 180° corresponding to one-half a bit. The associated pulse sequences are represented in FIGS. 5a and 5b respectively. It has been assumed that the bistable trigger stage BK11 and the bistable trigger stage BK21 respond only to the positive flank of the pulse sequences in the time diagrams 5a and 5b. Because of the given phase lead of the FM demodulation product, no signal will occur at the output of the bistable trigger stage BK11 because the resetting input R is always actuated at the instance of a positive pulse flank. In view of the lack of an output signal, no signal occurs at the input and output of the bistable trigger stage BK12 or at the output terminal y3. This is indicated in FIG. 5c,f,g as showing a zero line signal.

As shown in FIG. 5d at the output of the bistable trigger stage BK21 in the second signal path there will occur pulses which have a duration equal to the phase shift between the pulse diagrams FIGS. 5a and 5b which comprises one-half a bit. As seen from FIG. 5e with each positive pulse flank of the pulse sequence a at the input terminal y2, the monostable trigger stage MK2 will derive a pulse which has a duration of one-quarter of a bit of the pulse sequence shown in FIG. 5a and FIG. 5b. In other words, with the positive rear flank, the pulses at the output of the monostable trigger stage MK2 are checked for the presence of pulses corresponding to the curve shown in FIG. 5d and in the event of a positive result, the bistable trigger stage BK22 will be switched over from its rest state to its operative state. This process is repeated with every other additional pulse so that a positive output signal is maintained at the output of this bistable trigger stage as shown in FIG. 5h.

When the bistable trigger stage BK23 is in the release state, this output signal will be supplied to the output terminal y4 and switches over the multiplexers MUX1, MUX2 illustrated in FIG. 3 so as to reduce the phase displacement. The bistable trigger stages BK13 and BK23 are released by the switch-over pulse at the blocking input y5 which, in other words, prepares the bistable trigger stages BK13 and BK23 for the switch through of a signal at its input whereas after a given time delay when it triggers back to the original state, the monostable trigger stage MK23 switches back the bistable trigger stages BK13 and BK23 to their initial state. This ensures that the desired phase adaptation in the time period of switch-over will only be maintained until the switch-over has been accomplished and the described regulating process in the sum data pulse restoration unit STW has disappeared.

The switchback of the multiplexers MUX1 and MUX2 into their starting positions together with the triggerring back of the monostable trigger stage MK3 and the associated change in stage at the resetting inputs R of the bistable trigger stages does in fact trigger a further regulating process in the sum data pulse restoration unit but it only produces a phase change of 90° and it is unable to trigger a bit loss with the associated output.

The voltage diagrams illustrated in FIG. 6a through FIG. h illustrate the conditions which apply in the event that the phase of the FM demodulation product lags behind the AM demodulation product by one-half a bit. In this case, no output signal occurs at the output of the bistable trigger stage BK21 as shown in FIG. 6d since during a positive pulse flank occurring at its input the resetting pulse R is activated. This also applies to the signal at the output of the bistable trigger stage BK22 and the output terminal y4. As illustrated in FIG. 6, at the output of the bistable trigger stage BK22 designated as h there will occur a pulse sequence of pulses which have a time duration of one-half a bit. These pulses have delayed by one-half a bit in the delay element 2 as illustrated in FIG. 6f and their duration is interrogated by way of the output pulses of the monostable trigger stage MK2. As shown in FIG. 5, a continuous signal will occur at the output of the bistable trigger stage BK12 as shown in FIG. 6g and when the bistable trigger stage BK13 is in the release state, this will be fed to the output terminal y3.

Although the invention has been described with respect to preferred embodiments it is not to be so limited as changes and modifications may be made which are within the full intended scope as defined by the appended claims.

I claim as my invention:

1. A system for reception of digital communication signals which are impressed onto a carrier in the form of binary frequency modulation and radiated through a propagation medium which is subject to reflection, particularly, for reception in mobile stations wherein unsatisfactory reception which occurs as a result of phase and amplitude distortions is automatically detected to determine their origins with two supplemental arrangements, comprising receiving means including an IF stage receiving incoming signals, an FM demodulator receiving an input from said IF stage, an AM demodulator receiving an input from said IF stage, a dynamic distortion corrector receiving the output of said FM demodulator, a polarity integrator receiving an output of said dynamic distortion corrector and an input from said AM demodulator, an AM limiter receiving an output of said AM demodulator, an inverter receiving an output of said polarity integrator and an output of said AM limiter, a data analysis circuit receiving the output of said dynamic distortion corrector and outputs from said AM limiter, said inverter, and said AM demodulator, said data analysis circuit including an FM regenerator which receives the output of said dynamic distortion corrector, a phase follow-up device including a phase comparator (Ph) which receives the output of said FM regenerator and an output from said inverter, an AM decision device including a time evaluation circuit (ZB) which receives outputs from said inverter and said AM demodulator, a bistable trigger stage (BK2) which receives the output of said time evaluation circuit ZB, a change-over switch which receives the output of said bistable trigger stage BK2, the output of said phase follow-up device, the output of said AM limiter and the output of said inverter, said change-over switch controlled by the output of said bistable trigger stage, and a data regenerator receiving the output of said change-over switch.

2. A system as claimed in claim 1, wherein the time evaluation circuit includes for a time gate, a frame counter (Z1) which counts shaped pulse flanks derived from the inverter output signal and which at the end of a frame cycle emits a pulse to one input of the bistable trigger stage and to the resetting input of an event counter (Z2) which counts pulse flanks of the inverter output signal and which, when a given count is reached, emits a control pulse to the second input of the bistable trigger state, and the counting input of the event counter is preceded by an AND gate (G) which is opened by the output signal of a threshold value comparator (K) when, and only when, the AM demodulation product present at its input undershoots a given threshold value.

3. A system as claimed in claim 2, wherein the output signal of the AM decision device (14) is supplied, as a control signal, to said phase follow-up device (PE) directly, and as a switch-over signal to the change-over switch (U) indirectly through a delay element ($\tau 1$).

4. Apparatus according to claim 1 wherein said phase follow-up device includes a pair of delay means through which the outputs of said FM regenerator pass and said pair of delay means are controlled by the output of said phase comparator Ph.

5. A system as claimed in claim 4, wherein each of said delay means includes a pulse controlled shift register (SR1, SR2) which produce pulse trains derived from the FM pulse train, but which has a considerably higher pulse frequency than the FM pulse train, and output stages of the shift registers are connected, respectively to multiplexers (MUX1, MUX2) which are controlled by the phase comparator (PH) and which form a part of the delay arrangement.

6. A system as claimed in claim 5, wherein the frequency of the control pulse train for the shift registers (SR1, SR2) is four times the frequency of the FM pulse train, and the control of the delay arrangement, which consists of a shift register and a multiplexer (MUX1, MUX2) is accomplished in phase steps of $\pm 90°$.

* * * * *